(12) United States Patent
Brod et al.

(10) Patent No.: US 9,752,014 B2
(45) Date of Patent: Sep. 5, 2017

(54) PROCESS FOR THE MANUFACTURE OF NANO-SCALE, PRIMARY, COATED HYDROTALCITE AND HYDROTALCITE

(75) Inventors: Jochen Brod, Landershausen (DE); David Christopher Glende, Einbeck (DE)

(73) Assignee: K+S Aktiengesellschaft, Kassel (DE)

( * ) Notice: Subject to any disclaimer, the term of this patent is extended or adjusted under 35 U.S.C. 154(b) by 0 days.

(21) Appl. No.: 13/976,737

(22) PCT Filed: Dec. 21, 2011

(86) PCT No.: PCT/DE2011/002160
§ 371 (c)(1),
(2), (4) Date: Aug. 27, 2013

(87) PCT Pub. No.: WO2012/089197
PCT Pub. Date: Jul. 5, 2012

(65) Prior Publication Data
US 2013/0331497 A1    Dec. 12, 2013

(30) Foreign Application Priority Data
Dec. 27, 2010   (DE) .................. 10 2010 056 030

(51) Int. Cl.
*C08K 9/02* (2006.01)
*C09D 7/12* (2006.01)
*B82Y 30/00* (2011.01)
*C01F 7/00* (2006.01)
*C09C 1/40* (2006.01)
*C09C 1/42* (2006.01)

(52) U.S. Cl.
CPC .............. *C08K 9/02* (2013.01); *B82Y 30/00* (2013.01); *C01F 7/005* (2013.01); *C09C 1/40* (2013.01); *C09C 1/42* (2013.01); *C01P 2002/22* (2013.01); *C01P 2004/64* (2013.01); *C01P 2006/12* (2013.01)

(58) Field of Classification Search
CPC .................................. C08K 9/02; C09D 7/12
USPC .......................... 524/424; 106/461
See application file for complete search history.

(56) References Cited

U.S. PATENT DOCUMENTS

| | | | |
|---|---|---|---|
| 5,461,101 A * | 10/1995 | Rothon .............. | C01F 5/04 423/635 |
| 5,539,135 A | 7/1996 | Breuer et al. | |
| 6,803,401 B2 | 10/2004 | Parekh et al. | |
| 2007/0161727 A1 | 7/2007 | Kobayashi et al. | |
| 2010/0011993 A1* | 1/2010 | Glende .............. | B82Y 30/00 106/461 |

FOREIGN PATENT DOCUMENTS

| | | |
|---|---|---|
| CN | 101735532 A | 6/2010 |
| EP | 0 189 899 | 8/1986 |
| EP | 1 803 778 | 7/2007 |
| EP | 1 803 778 A3 | 7/2007 |
| EP | 1803778 * | 7/2007 |
| EP | 2 141 124 | 1/2010 |
| WO | 92 17405 | 10/1992 |

OTHER PUBLICATIONS

International Search Report Issued Jun. 13, 2012 in PCT/DE11/02160 Filed Dec. 21, 2011.
International Preliminary Report on Patentability and Written Opinion issued Jul. 11, 2013 in PCT/DE2011/002160 filed Dec. 21, 2011.
International Search Report and Written Opinion issued Jun. 13, 2012 in PCT/DE2011/002160 filed Dec. 21, 2011 with English translation of categories of cited documents.

* cited by examiner

*Primary Examiner* — Deve E Valdez
(74) *Attorney, Agent, or Firm* — Oblon, McClelland, Maier & Neustadt, L.L.P.

(57) ABSTRACT

The invention presented concerns a process for the manufacture of coated, nano-scale, hydrotalcites, where the individual, primary, nano-scale hydrotalcite particles are coated. In order to obtain the corresponding hydrotalcite particles in coated, nano-scale form, the additive precipitation reaction is employed invention-related. Every primary particle indicates its own coating in this case. In a further aspect, the registration is directed toward coated primary, nano-scale, hydrotalcite particles, in particular obtainable in accordance with the invention-related process. A further aspect of the invention is directed toward composites containing nano-scale hydrotalcites, in particular hydrotalcites manufactured in accordance with the invention presented. Finally the registration presented is directed towards compositions containing mixtures of magnesium hydroxide and hydrotalcite.

19 Claims, No Drawings

PROCESS FOR THE MANUFACTURE OF NANO-SCALE, PRIMARY, COATED HYDROTALCITE AND HYDROTALCITE

CROSS REFERENCE TO RELATED APPLICATIONS

The present application is a 35 U.S.C. §371 national stage patent application of International patent application PCT/DE2011/002160, filed on Dec. 21, 2011, published as WO/2012/089197 on Jul. 5, 2012, the text of which is incorporated by reference, and claims the benefit of the filing date of German application no. 10 2010 056 030.8, filed on Dec. 27, 2010, the text of which is also incorporated by reference.

The invention presented concerns a process for the manufacture of coated, nano-scale, hydrotalcites, where the individual, primary, nano-scale hydrotalcite particles are coated. In order to obtain the corresponding hydrotalcite particles in coated, nano-scale form, the additive precipitation reaction is employed invention-related. Every primary particle indicates its own coating in this case. In a further aspect, the registration is directed toward coated primary, nano-scale, hydrotalcite particles, in particular obtainable in accordance with the invention-related process. A further aspect of the invention is directed toward composites containing nano-scale hydrotalcites, in particular hydrotalcites manufactured in accordance with the invention presented. Finally the registration presented is directed towards compositions containing mixtures of magnesium hydroxide and hydrotalcite.

STATE OF THE ART

It is generally known that filling materials in plastic are employed for the modification of the properties of these plastics, as well as for cost reduction. Such filling materials can be coarse-scale as well as nano-scale with regard to their particle size, and are mostly inserted as powders.

Magnesium hydroxide has the most diverse application for this in industry. Thus e.g. magnesium hydroxide is employed as a flame-suppressing filling material in the most varied types of plastics. Furthermore, corresponding magnesium hydroxides are employed in thermoplastic or thermosetting materials as a filling material.

Also hydrotalcite has the most varied applications as a filling material in the plastic sector. One of the best known applications for hydrotalcite is its consumption as a medication against an over-acidified stomach. Other applications of hydrotalcite include employment as flame inhibitor, catalyzer, storage material for pollutants, extending to thixotropic agents for cosmetic products. However, the application here is especially important as filling material and flame inhibitor, where the hydrotalcite is used in coarse-scale and in nano-scale. Thus hydrotalcites are described as environmentally-friendly stabilizers in PVC.

Coarse-scale hydrotalcite is designated as such in the following which indicates a primary crystal size >0.1 µm. Nano-scale hydrotalcite is a hydrotalcite which indicates a primary crystal size of ≤0.1 µm, i.e. in the range of 1 to 100 nm.

In fact the most important and quantitatively largest industrial application of hydrotalcite is its utilization as a mineral filling material for plastics, in particular for polyvinyl chloride. In this case, the hydrotalcite is employed as a thermostabilizer in the manufacture of polyvinyl chloride. The hydrotalcite replaces lead-containing and cadmium-containing stabilizers in this case. From 2015, heavy-metal content stabilizers should be dispensed with completely in the manufacture of PVC. The hydrotalcite acts as the heavy-metal content stabilizers as an acid collector in this case, a property which is also used in the pharmaceutical sector. Thus hydrotalcite is marketed by Suedchemie under the product name SorbAcid 911®.

Nano-scale hydrotalcite is employed e.g. as a flame-retardant. The flame-suppressing effect of hydrotalcite in this case is mainly based on the separation of water. Furthermore, the fire residue of metallic oxide prevents the gas exchange, which causes an additional flame-suppressing effect; hydrotalcites are correspondingly incorporated as flame-suppressing agents in different polymers, e.g. in polystyrenes, polyamides and polyolefins.

However, the employment of nano-scale hydrotalcite first leads to polymers which are also sufficient in their mechanical properties.

Hydrotalcites are compounds which indicate a structure with which positively-charged, mixed hydroxide layers are formed, between which anions are present (polycations) for the charge equalization. Hydrotalcite compounds are basically formed of magnesium as a bivalent metal cation and aluminum as a trivalent metal cation. Usually OH and $CO_3$ are present as anions. However, hydrotalcite compounds are also known, in which further cations and anions are present in intercalary form. These elements include zinc, iron, copper, nickel, chrome, scandium or cobalt. As anions there can be present carbonate, sulfate, hydroxide, chloride, nitrate or their mixtures or organic anions, such as acetate, benzoate or terephthalate.

The percalite product is marketed by the Co. Axo Nobel. Here it involves a nano-composite which is based on hydrotalcite, and in which OH anions are replaced partially through other organic anions. This product should indicate improved properties as nano-filling materials, in particular in the area of fire protection, however, also improved mechanical properties.

Particles can be further modified in the most different ways. Thus, in case of coating particles of different geometry, size and density, they are covered with an additive, usually an organic additive. The surface properties are defined modified in this case. Thus a similar polarity can be achieved by coating between the polymer and the filling material. This makes possible a uniform working-in of the mineral filling material into the organic plastic matrix.

In order to enable coupling to the filling material surface, the organic substances mostly require one or more anionic groups for the surface modification.

Different coating processes are described in the literature. Thus e.g. EP 2 141 124 describes a process for the manufacture of coated magnesium hydroxide particles. DE 10 2006 027 915 describes a process for the manufacture of magnesium hydroxide particles. From DE 10 2005 025 719 A1, processes are known for the generation of a dispersion of de-agglomerated barium sulfate in plastics or plastic preliminary stages.

The invention presented takes as a basis the task of providing new processes which allow a manufacture of coated, nano-scale, hydrotalcite particles in high yield. The hydrotalcites thus obtained should indicate improved properties as filling materials in plastics, in particular the mechanical properties of these composite materials manufactured in this way should be improved.

A further task of the invention presented is the appropriation of such nano-scale, primary, coated hydrotalcite particles, as well as compositions including magnesium hydroxide and hydrotalcite.

FULL DESCRIPTION OF THE INVENTION

In an initial aspect, the invention presented is directed towards a process for the manufacture of nano-scale hydrotalcite with the step of bringing into contact i) a magnesium saline solution with ii) an aluminum saline solution, with the formation of a reaction mixture for the precipitation of coated hydrotalcite after the addition of sodium carbonate and sodium hydroxide solution, characterized in that in at least one of the solutions i) or ii), one the following additives A and/or B, possibly in combination with the additive C, is included, or in case of the bringing into contact of i) and ii), one the following additives A and/or B, possibly in combination with the additive C, is simultaneously brought in contact with the reaction mixture resulting from i) and ii), where additive A is a growth inhibitor, additive B is a dispersing agent and additive C is a diluted fatty acid solution, preferably a stearate solution.

The nano-scale hydrotalcite particles available with the invention-related process are characterized in that they are provided with a coating of the surface as early as during the precipitation process, due to the existence of the above-designated additives. As a result of this, an electrostatic and steric stabilization of the individual primary particles is achieved and a too strong re-agglomeration of the particles suppressed. The polarity of the particles is changed by correspondingly suitable additives and preferably adapted to the polarity of the polymeric target matrix.

The thus manufactured nano-scale, coated, hydrotalcite particles, which can be present invention-related as diluted suspension or dispersion, are exceptionally suited for further processing in composites.

The expression "nano-scale" means a particle size distributions whose mean particle diameter (d50) is ≤100 nm. This means those particles are designated as nano-scale particles where more than 50%, as well as more than 70%, 80%, in particular more than 90%, as well as 95%, and in particular 98% of the particle diameters, are ≤100 nm.

Under the expression "coarse-scale", those hydrotalcites are designated which indicate a crystal size of the primary particles >0.1 μm.

The invention-related additives used during the precipitation are a growth inhibitor A (additive A), a dispersing agent B (additive B), a diluted fatty acid solution, in particular a diluted stearate solution C (additive C), or mixtures of same.

As a growth inhibitor A, known growth inhibitors can be employed, as described in the state of the art e.g. in DE 103 to 57 116 A1.

The growth inhibitor A is characterized in that it indicates at least two or more anionic groups. Preferably the inhibitor, as an anionic group, includes at least two of the following groups: One sulfate, one sulphonate, one phosphonate, or a phosphate group, preferably at least two identical to these groups. These anionic groups make possible an anionic coupling of the additive with the surface of the hydrotalcite particle. Alternatively, there can also be two different anionic groups.

In the case of the growth inhibitor A, it can involve monomers, oligomers or polymers. Of course the growth inhibitors can also indicate combinations of two or more of the above-designated groups.

The growth inhibitor A can also be employed as a salt of this compound, where the main chain, containing multiple anionic groups and consisting of hydrophobic and/or hydrophilic substructures, can also be branched and/or cyclical. Furthermore, heteroatoms (nitrogen, oxygen, sulfur or phosphorus) can be integrated into this main chain.

The growth inhibitors A can be present in functionalized form, that is they can include one or more reactive end groups, e.g. hydroxyls. These can interact later as a functional group with a polymer and e.g. form covalent bonds. Designated here as an example are the covalent bonds which form between OH groups and di-isocyanate, with the formation of a polyurethane.

Such functionalized growth inhibitors A are e.g. hydroxy-substituted carboxylic acid compounds, such as hydroxy-substituted monocarboxylic and dicarboxylic acids with 1 to 20 carbon atoms, e.g. citric acid, malic acid, dihydroxy succinic acid and 2-hydroxolic acid. Polyacrylates are especially suitable.

Also correspondingly well suitable are phosphoric acid acrylic compounds with 1 to 10 carbon atoms, which possibly indicate further hydroxyls.

Alternatively, compounds can also be employed which further include nitrogen atoms. Suitable compounds are (among other things) polyamino compounds, such as polyaspartic acids.

Such reactive groups can further be double bonds, hydroxy, amine and sulphydryl groups.

The quantity of growth inhibitor A can vary. Usually quantities from 0.1 to 30 Mas %, as well as up to 20 Mas %, with reference to the solids content of hydrotalcite, are employed. However, the quantity can be increased up to 50 Mas %, in particular in the case where a dispersing agent B stearate and/or stearate C are additionally present.

Typical examples of growth inhibitors A are sodium citrate/citric acid, polyacrylates, e.g. Sokalan® PA 20, Dispex® N40 from Ciba-Geigy or polyphosphates, e.g. Calgon® N.

Similar to the growth inhibitor A, the dispersing agent B indicates at least two or more anionic groups in its molecule. Also it can be present as a monomer, an oligomer or a polymer. The dispersing agent B can also be employed as a salt of this compound, where the main chain containing one or more anionic groups can be branched or cyclical. They indicate correspondingly hydrophobic and/or hydrophilic substructures. This (these) one or more anionic group(s) present in oligomers or polymers can be (among other things) carboxy, phosphonate, phosphate, sulphonate or sulfate groups, which cause an anionic coupling of the dispersing agent B on the hydrotalcite surface. As well as the designated anionic groups, further main chains and possibly additional side chains can be present in the molecule of the dispersing agent B. These can stabilize the formed particles electrostatically and/or sterically, and thus suppress a re-agglomeration.

The dispersing agent B further makes it possible to stabilize the formed hydrotalcite suspension and/or dispersion, in order to be provided with storage-stable suspensions and/or dispersions. The dispersing agents B additionally provide the particle with an external polarity, which, according to the selection of the dispersing agent, provide the particles with more hydrophobic or more hydrophilic properties, and in this way influence the polarity of these particles in such a way that they are better suited for later utilization e.g. in a polymer matrix, and prevent an agglomeration in the polymer and/or promote de-agglomeration in the matrix. In this way, these hydrotalcite particles, with preference nano-scale hydrotalcite particles, can be distributed uniformly in de-agglomerated form in the polymer matrix.

As well as the designated anionic groups, the dispersing agent B can further contain reactive end groups and can thus be functionalized. These functionalized groups include hydroxyls, however, also double bonds, amine and thiol groups. With the aid of these functional groups, a later covalent linking to a polymer can be implemented, similar as in the case of the above described growth inhibitors A.

The dispersing agent B indicates good water solubility, since this is present either invention-related in the magnesium saline solution or the aluminum saline solution, or at least added simultaneously to the reaction mixture of these two solutions in case of the in-situ precipitation.

Suitable dispersing agents B, which can be employed in diluted solvents, include polyacrylates, such as e.g. Sokalan® PA (BASF), polyethercarboxylate, such as e.g. Melpers® 0030 (BASF), phosphoric acid ester, such as e.g. Disperbyk® 102 (Byk-Chemie), or polyphosphates, such as e.g. Calgon®N or high-molecular polymers with filling-material-affinity groups, e.g. present as block copolymers, such as e.g. Disperbyk® 190.

The growth inhibitor A can be a dispersing agent B at the same time, e.g. in the case of Dispex® N40 (Ciba).

The quantity of the dispersing agent B can vary. Usually the dispersing agent B is present in the reaction mixture in a quantity from 0.1 to 30 Mas %, preferably 0.1 to 20 Mas %, with reference to the solids content of hydrotalcite. If, after the invention-related precipitation, a further processing is implemented by means of ultrasonic or pearl pulverization, the energy to be exerted in this case is less in comparison to a traditional mechanical comminution process, since only a de-agglomeration of loose agglomerates must be implemented here and not a mechanical breaking of crystals.

The dispersing agent B is employed in the invention-related process, in particular in the case where a storage-stable suspension or dispersion should be obtained. In particular, when the coated hydrotalcite particles obtained should be further processed directly, e.g. worked into a thermoplastic polymer, a precipitation of the hydrotalcite is implemented with the presence of the dispersing agent B.

The group of the fatty acids may be designated as additive C. These can be present both rectilinear as well as branched, saturated, individually or multiple unsaturated, and with different alkyl chain lengths (low, medium and higher chain lengths). In the text below the stearate is designated as an example of this additive C.

The stearate solution is a diluted stearate solution, e.g. a sodium or potassium stearate solution. The stearate can be added in solid form to the diluted receiver in the reactor, and is thus present in dissolved form during precipitation. Due to its carboxy group as an anionic group, the stearate covers the primary particles of the hydrotalcite which are formed during precipitation and coats them correspondingly.

The stearate itself usually does not have any influence on the primary crystal size of the primary particles of the hydrotalcite which is formed. Although the stearate itself does not allow any steric stabilization of the particles in diluted solutions, the sedimented, loose, hydrotalcite agglomerates indicate an improved de-agglomeration characteristic in case of further processing in the organic medium. This means that the coating of the primary particles with stearate enables the receipt of suspensions or dispersions of separately-coated hydrotalcite particles. Even after the drying of the suspensions and/or dispersions, the then present agglomerates of the coated hydrotalcite particles indicate improved de-agglomeration properties.

The quantity of sodium stearate employed can vary. It is in the range from 0.1 to 10 Mas % with reference to the solids content of hydrotalcite.

The designated additives can also be employed as mixtures. Preferably e.g. a mixture of a diluted stearate solution C and a growth inhibitor A as a coating for the primary particles of the hydrotalcite. The quantities of stearate and growth inhibitor A employed in this case are in the above-designated range, with preference in the range from 0.1 to 10 Mas %, with reference to the solids content of hydrotalcite in the reaction mixture.

The additives can be added to the reaction mixture separately or together, in the form of a diluted solution in this case. Alternatively, the additives A and B can be present together or separately in one of the output solutions aluminum saline solutions and/or magnesium saline solutions.

It is preferred that a dispersing agent B is present as an additive in the reaction mixture, preferably a quantity from 0.1 to 30 Mas %, with reference to the solids content of hydrotalcite.

Furthermore, it is preferred that the reaction mixture, in addition or alternatively includes the A growth inhibitor, preferably in a quantity from 0.1 to 30 Mas %, with reference to the solids content of hydrotalcite and/or fatty acid, preferably in a quantity from 0.1 to 10% Mas with reference to the solids content of hydrotalcite, With the invention-related process, it is possible that every individual hydrotalcite particle is coated. Correspondingly, such individually coated hydrotalcite particles are preferred.

With the process, those nano-scale hydrotalcite particles are preferably manufactured where up to 90% of individual particle indicate a diameter of ≤100 nm at least.

In a further preferred implementation form, the invention-related hydrotalcites indicate further bivalent metals, in particular $Zn^{2+}$.

As further anions, there can in particular be present in the hydrotalcites those selected from sulfate, chloride, in particular those present selected from sulfate, chloride, nitrate or their mixtures.

It is preferred in particular that hydrotalcites manufactured invention-related are of the general formula $$Mg_6Al_2(OH)_{16}CO_3.4H_2O$$

In the invention-related process, the bringing into contact of the magnesium saline solution with the aluminum saline solution at temperatures from 0° C. to 90° C. is preferably implemented, in particular above a range from 50° C. to 80° C.

The invention-related process functions in this case analogous to the process from Kyowa, DE 15 92 126 C1, which concerns a synthetic hydrotalcite and processes for its manufacture.

In addition to the steps described in the above-designated patent, an additive is added invention-related, in particular one of the additives A and/or B, possibly in combination with the additive C as defined here. As a result of the addition of the additives, it is possible to manufacture nano-scale, coated, hydrotalcite. In accordance with DE 15 92 126 C1, the synthesis occurs in such a way that an aluminum compound is mixed with a magnesium compound in an alkaline medium in the presence of carbonation. The reaction takes place in this case with a pH value of at least 8 under ambient pressure and temperatures of 0° C. to 150° C.

The concentration of the magnesium salt in this diluted solution in this case is preferably in the range 1 to 33 Mas %.

Different aluminum salts can be employed as aluminum saline solution. Usual aluminum salts include soluble aluminates or water-soluble aluminum salts. Aluminum sulfate or aluminum chloride solutions are employed with preference. A magnesium chloride solution is employed with particular preference as a magnesium solution.

In an especially preferred implementation form, the process is implemented with a 33 Mas % magnesium chloride saline solution. The ratio of magnesium to aluminum is 0.66 to 8 to 1. The ratio is preferably 3 to 1.

Thus the magnesium saline solution and the aluminum saline solution dissolved in water are submitted as solution 1. To this solution is added the solution 2, an alkaline hydroxide solution, to increase the pH value. This solution is in particular one which further includes an alkali carbonate. This solution is preferably one of sodium hydroxide and sodium carbonate.

With the aid of the invention-related process, it is possible to provide nano-scale hydrotalcites with improved properties as coated nano-scale hydrotalcite-primary particles.

In a further aspect, the registration presented is directed towards coated, primary, nano-scale hydrotalcite particles, which are obtainable with an invention-related process.

These coated, primary, nano-scale hydrotalcite particles are in particular those which indicate at least 90%, preferably at least 95%, particularly preferred at least 99%, of particles with a diameter ≤100 nm.

The invention-related, coated, primary nano-scale hydrotalcite particles are furthermore in a preferred implementation form which indicate particles with a BET surface ≥50 $m^2/g$, in particular ≥70 $m^2/g$. Particularly preferred are those particles which indicate a BET surface ≥100 $m^2/g$.

The suspensions and/or dispersions of hydrotalcite obtained can be further-processed as such, or subsequently dried e.g. through spray drying.

The agglomerates of hydrotalcite obtained in case of a utilization of a combination of fatty acid derivative solution C and growth inhibitor B and/or additive A, can be easily de-agglomerated and processed further.

As a result of the utilization of the additives, such as additive B or in particular the growth inhibitor A in combination with the stearate C, the primary particles are present in this case in a nano-scale range, so that nano-scale, coated, hydrotalcite particles are obtained.

In this case, coated, nano-scale hydrotalcite particles are obtained, which are present as de-agglomerated particles in the dispersion, due to the existence of the sterically-stabilizing dispersing agent B. This dispersion can be further processed directly.

As already detailed regarding the additives in general, the additives growth inhibitor A and/or dispersing agents B can be employed in functionalized form. These two functional additives, which are present as a coating on the primary particles of the hydrotalcite, cause a significant improvement in the mechanical properties of the polymeric materials after the working-in of the filling material.

If required, the pH value of the reaction mixture can be adjusted to the required values with suitable acids or bases, in case of the precipitation or the subsequently obtained solution of coated, nano-scale, hydrotalcite particles.

By the adjustment of the polarity of growth inhibitor A and dispersing agent B to the polarity of the finished polymer, the working-in of the hydrotalcite particles can be significantly improved as a filling material in monomers, oligomers and polymers through an easier wettability of the particles.

The hydrotalcite particles obtainable with the invention-related process, in case of the addition of growth inhibitor A, indicate at least 90%, with preference at least 95%, at least up to 98%, especially preferred at least up to 99%, in particular up to 100%, a diameter of <1,000 nm, preferably <500 nm, in particular preferred <100 nm, especially preferred <50 nm.

In particular through the employment of the growth inhibitor A, it is possible to control the primary particle size of the hydrotalcite particles. This means that the greater the quantity of growth inhibitor A, the smaller the average particle diameter of the primary particles obtained.

Corresponding to the primary particle size, the primary particles of the hydrotalcite obtainable with the invention-related process, with the addition extra of growth inhibitor A, indicate a BET surface of preferably 50 $m^2/g$, with preference ≥70 $m^2/g$, at least ≥100 $m^2/g$ and especially preferred ≥120 $m^2/g$. In particular, the addition of the growth inhibitor A allows an increase of the specific surface (BET) of the precipitated hydrotalcite particles. It can be determined here that e.g. the higher the quantity of growth inhibitor A in the reaction mixture, the higher the specific surfaces (BET) which are obtainable.

A significant feature of the invention-related process is the capability to coat the primary particle individually, which means that the coarse-scale or nano-scale primary particles present in the suspension and/or dispersion are coated completely individually with the added additives.

In a further aspect, the registration presented is directed towards composites containing hydrotalcite, in particular hydrotalcite available according to one of the invention-related processes or containing hydrotalcite invention-related.

In case of the composites, it involves in particular those manufactured of a plastic as from polyvinyl chloride, and hydrotalcite as a filling material.

In a further preferred implementation form, the composite is from a plastic, such as in particular polyvinyl chloride, in combination with a mixture of hydrotalcite and magnesium hydroxide, as a filling material.

It could be indicated that, through the employment of hydrotalcite, the properties of the composite could be improved with respect to compounds with commercially available hydrotalcite. In addition, it was indicated that the manufacture of the composites can be simplified. Thus the extrusion of the composites can be implemented in a simplified way.

The extrusion temperature could be e.g. significantly reduced. In this way, the individual component parts of the composite are not influenced so strongly in sympathy, e.g. thermally destroyed, and the material properties of the composite are improved. The invention-related composites containing a plastic and hydrotalcites manufactured invention-related indicate, with respect to known composites, an improved breaking elongation and an improved impact resistance. The polymer melt indicates a reduced viscosity during manufacture. These properties are represented once again in the enclosed examples.

Furthermore, the nano-scale hydrotalcite, in accordance with the invention presented, in particular a nano-scale hydrotalcite with a dispersing agent B, such as for example Byk 102®, indicates high specific surfaces and thus small primary particles.

The invention-related composites of PVC with hydrotalcite are employed for example for the manufacture of cable conduits and many utility goods (roller shutter louvers, etc.).

It follows further from the utilization of the invention-related composites that the content of magnesium hydroxide in flame-protected plastics can be decreased from the usual 60 Mas % of coarse magnesium hydroxide to approximately 40 Mas % $MgOH_2$ and approximately 10 Mas % nano-scale hydrotalcite, where the allocation to the highest fire resistance class (e.g. UL94 V0) is maintained. As a result of the decrease of the filling material content, the mechanics of the composite are improved significantly.

Furthermore, the registration presented is directed towards processes for the manufacture of these composites, in particular through extrusions processes. The invention-related process for the manufacture of the composites includes in this case the mixing of plastic, in particular polyvinyl chloride, with hydrotalcite, in particular hydrotalcite manufactured in accordance with the invention-related process or with the use of the invention-related hydrotalcite.

Finally, the registration presented is directed in a final aspect towards compositions containing 1 to 60 Mas % $MgOH_2$, preferably 40 to 60 Mas % $MgOH_2$, and 1 to 20 Mas % hydrotalcite, in particular 10 to 20 Mas % hydrotalcite, with reference to the weight contents of the composite. In the case of the hydrotalcite, it involves in particular a hydrotalcite manufactured according to one of the invention-related processes.

This composition from magnesium hydroxide and the invention-related hydrotalcite makes possible the reduction of the employed quantities of magnesium hydroxide filling materials in composites. This means that these compositions indicate improved properties than composites in which pure magnesium hydroxide is employed as a filling material.

By the combination of magnesium hydroxide with invention-related hydrotalcite, it is possible to reduce the employed quantity of filling material in the composite without the mechanical properties of the composite being impaired. With preference, the mechanical properties of the plastic are significantly improved.

These compositions are particularly suitable for employment in compounds used for fire protection (UL94 V0).

The invention is further represented with the aid of examples. These examples serve for the further explanation of the invention without limiting it to these examples.

EXAMPLE 1

Manufacture of Hydrotalcite

Experiments with the Use of Coating Additives

Within the framework of this series of experiments, three additives were tested. Two additives from the company Byk-Chemie (DISPERBYK®-102 & DISPERBYK®-190) and one additive from the manufacturer Ciba (Dispex N40) were used. All three experiments were implemented with high volume flows and at room temperature. The concentration ratio corresponded to that of the Kyowa patent, DE15 92 126 C1, (see footnote Tab. 1). The quantity of additive which was employed in the experiments was approx. 5 Mas %, with reference to the yield of hydrotalcite (approx. 50 g) which was obtained in the experiments. The additive employed was placed into the reaction vessel with 200 ml distilled water. The individual weighed-in quantities and parameters are listed in Table 1.

TABLE 1

Representation of the laboratory experiments 1 to 2 with coating additive Byk

| Experiment No. | 1 | 2 |
|---|---|---|
| Concentration | 2* | 2* |
| Additive | Byk-102 | Byk-190 |
| Solution 1 | | |
| $MgCl_2$ solution (33%) [g] | 172.73 | 172.73 |
| $AlCl_3 \times 6\ H_2O$ [g] | 48.16 | 48.16 |
| Solution 2 | | |
| NaOH [g] | 40.00 | 40.00 |
| $Na_2CO_3 \times 10\ H_2O$ [g] | 94.44 | 94.44 |
| Reaction temperature [° C. or RT] | RT | RT |
| Volume flow [ml/min] | 33.22 (Flow80) | 33.22 (Flow80) |
| Agitator speed [rpm] | 300 | 300 |
| Post-agitation time [min] | 15 | 15 |
| Receiver (reactor) | 200 ml dist. $H_2O$ + 2.45 g additive | 200 ml dist. $H_2O$ + 2.45 g additive |
| pH value (reaction end) | 8.12 | 8.40 |
| Yield [%] | 81.48 | 80.16 |
| Hydrotalcite phase* [Yes/No] | yes | yes |
| Spec. surface [$m^2/g$] | 127.42 | 73.94 |

2*: Concentration dependent on the Kyowa patent, DE 15 92 126 C1 ($MgCl_2$: 0.6 mol/l, $AlCl_3$: 0.2 mol/l, NaOH: 0.1 mol/l, $Na_2CO_3$: 0.33 mol/l)
RT: Room temperature
Flow80: Adjustment on the ismatec hose pump
Hydrotalcite phase*: Confirmation through X-ray diffractometry analysis In the following experiment (see Tab. 2), the above-mentioned Dispex N40 was employed as an additive.

TABLE 2

Representation with coating additive Dispex

| Experiment No. | 3 |
|---|---|
| Concentration | 2* |
| Additive | Dispex N40 |
| Solution 1 | |
| $MgCl_2$ solution (33%) [g] | 172.73 |
| $AlCl_3 \times 6\ H_2O$ [g] | 48.16 |
| Solution 2 | |
| NaOH [g] | 40.00 |
| $Na_2CO_3 \times 10\ H_2O$ [g] | 94.44 |
| Reaction temperature [° C. or RT] | RT |
| Volume flow [ml/min] | 33.22 (Flow80) |
| Agitator speed [rpm] | 300 |
| Post-agitation time [min] | 15 |
| Receiver (reactor) | 200 ml dist. $H_2O$ + 2.45 g additive |
| pH value (reaction end) | 8.27 |
| Yield [%] | 80.32 |
| Hydrotalcite phase" [yes/no] | Yes |
| Spec. surface [$m^2/g$] | 70.21 |

2*: Concentration dependent on the Kyowa patent, see footnote Table 1
RT: Room temperature
Flow80: Adjustment on the ismatec hose pump
Hydrotalcite phase*: Confirmation through X-ray diffractometry analysis Experiments in the Technical System The indicated quantities are with reference to a product theoretical yield of 1000 kg.

The yields with the laboratory experiments were approx. 81%.

Experiments 4-5 (Dependent on Kyowa Industrial Property Rights):

|  | Solution 1 |  | Solution 2 |
|---|---|---|---|
| MgCl$_2$ sol. 33% | AlCl$_3$ × 6 H20 | NaOH sol. 25% | Na$_2$C03 |
| 2858.4 kg | 796.9 kg | 2647.8 kg | 579.2 kg |

Experiments 6-7:

| Solution 1 | | | Solution 2 | | |
|---|---|---|---|---|---|
| MgCl$_2$ sol. 33% | AlCl$_3$ × 6 H$_2$O | H$_2$O | NaOH sol. 25% | Na$_2$CO$_3$ | H$_2$O |
| 2860.9 kg | 797.7 kg | 3297.9 kg | 2650.10 kg | 579.7 kg. | 1726.7 kg |

In the above experiments 6 and 7, BET values 63 to 67 m$^2$/g were obtained. As a comparison; the BET values with the product Alcamizer from Kisuma amounted to approximately 8-10 m$^2$/g (kisuma.com/alcamizer.html).

EXAMPLE 3

Manufacture of PVC Composite

The products obtained from these experiments were employed with the usual processes generally used in the manufacture of the composite materials. The recipe employed is represented in Tab. 3.

TABLE 3

Recipe for the manufacture of the composite materials

| Product | KKS 16 | KKS 17 | CaZn standard |
|---|---|---|---|
| PVC SH 6830 | 100 | 100 | 100 |
| Sorbic acid 911 | 0.8 | — | — |
| Hydrotalcite in accordance with the invention presented* | — | 0.8 | — |
| Calcium stearate | 0.8 | 0.8 | — |
| Zinc stearate | 0.8 | 0.8 | — |
| Rhodiastab 55 | 0.2 | 0.2 | — |
| Mark CZ 2000 | — | — | 2.5 |
| Marklube 367 | 0.5 | 0.5 | 0.5 |
| Paraloid K 125 | 1 | 1 | 1 |
| Licowax PE 520 | 0.2 | 0.2 | 0.2 |
| Loxiol G 60 | 0.8 | 0.8 | 0.8 |
| Kronos 2220 | 4 | 4 | 4 |
| Hydrocarb 95 T | 5 | 5 | 5 |

All specifications in parts!
KKS 16 = comparison product, sorbic acid 911, Sued-Chemie
KKS 17 = composite, with Byk-102, see Vers. 1

In case of the experiments, it was surprisingly indicated that the viscosity of the melted polymer masses was considerably lower than expected. As a result, the extruder temperature could be lowered from 200° C. (with competition product) to 180° C., where the same viscosity was retained as with the competition product. A lower extruder temperature reduces the energy input and lowers costs.

Mechanical Investigation of PVC Composites

TABLE

Mechanical characteristic values of PVC U-profiles

| Sample number | Tensile test | | | Impact resistance | |
|---|---|---|---|---|---|
| | $\sigma_M$ [MPa] | $\epsilon_M$ [%] | $E_t$ [MPa] | $3_{cU-20}$ [kJ/m$^2$] | $3_{cA+23}$ [kJ/m$^2$] |
| CaZn standard | 47.1 | 2.9 | 2884 | NB | 14.6 |
| KKS 16 | 45.8 | 3.2 | 2878 | NB | 16.7 |
| KKS 17 | 47.3 | 3.2 | 2964 | NB | 17.2 |

NB: None Break

Determination of the Acid Capacity ph measuring device process according to EN ISO 182-2: 1999

Principle of the Method:

2 g of the substance to be tested is present in a gas flow (N$_2$) and is heated up to 200° C. The hydrogen chloride gas formed is absorbed in a 0.1 mol/l sodium chloride solution, and in this way the pH value of the solution is lowered. At the beginning of the measurement, the solution has a pH value of 6, the stability time ts is reached with a pH value of 3.8.

Results:

| Sample number | ts (min) |
|---|---|
| CaZn standard | 71 |
| KKS 16 | 77 |
| KKS 17 | 71 |

The acid capacity of the hydrotalcite manufactured invention-related is in accordance with the determined ts values with the CaZn standard, and comparable with the sorbic acid and provides sufficiently good results.

The invention claimed is:

1. Coated, primary, nano-scale, hydrotalcite particles obtained by a process, comprising:
   contacting i) a magnesium saline solution with ii) an aluminum saline solution, to obtain a first reaction mixture,
   adding sodium carbonate and sodium hydroxide to the first reaction mixture, to obtain a second reaction mixture, and
   precipitating a coated, primary, nano-scale, hydrotalcite particles from the second reaction mixture,
   wherein
   one of the solutions i) or ii) comprises at least one additive selected from the group consisting of A and B, optionally in combination with an additive C, or
   the contacting of i) and ii) further comprises contacting at least one additive selected from the group consisting of A and B, optionally in combination with an additive C, with the first reaction mixture,
   wherein the additive A is a growth inhibitor, the additive B is a dispersing agent and the additive C is a diluted fatty acid solution, and
   wherein the primary hydrotalcite particles are each individually coated.

2. The coated, primary, nano-scale hydrotalcite particles of claim 1, wherein the particles have a BET surface area of ≥50 m$^2$/g.

3. A composite, comprising:
the coated, primary, nano-scale hydrotalcite particles of claim 1, as a filling material.

4. A composition, comprising:
1 to 60 mass % $MgOH_2$, and
1 to 20 mass % coated, primary, nano-scale hydrotalcite particles according to claim 1.

5. The coated, primary, nano-scale hydrotalcite particles of claim 1, wherein said additive C is present and is a stearate solution.

6. The coated, primary, nano-scale hydrotalcite particles of claim 1, wherein hydrotalcite of the particles has a formula $Mg_6Al_2(OH)_{16}CO_3 \cdot 4H_2O$.

7. The composite of claim 3, further comprising a plastic.

8. A process for manufacturing the composite of claim 3, comprising:
an extrusion process in which a plastic is mixed with said coated, primary, nano-scale hydrotalcite particles.

9. A composite, comprising:
a plastic,
coated, primary, nano-scale hydrotalcite particles, as a filling material in the plastic, in a content of from 1 to 20 mass % with respect to the composite, and
$MgOH_2$ in a content of from 1 to 60 mass % with respect to the composite,
wherein the coated, primary, nano-scale hydrotalcite particles are obtained by a process, comprising:
contacting i) a magnesium saline solution with ii) an aluminum saline solution, to obtain a first reaction mixture,
adding sodium carbonate and sodium hydroxide to the first reaction mixture, to obtain a second reaction mixture, and
precipitating a coated, primary, nano-scale, hydrotalcite particles from the second reaction mixture,
wherein one of the solutions i) or ii) comprises at least one additive selected from the group consisting of A and B, optionally in combination with an additive C, or wherein the contacting of i) and ii) further comprises contacting at least one additive selected from the group consisting of A and B, optionally in combination with an additive C, with the first reaction mixture,
wherein the additive A is a growth inhibitor, the additive B is a dispersing agent, and the additive C is a diluted fatty acid solution,
wherein the primary hydrotalcite particles are each individually coated, and
wherein the composite has a UL94 V0 fire resistance.

10. The composite of claim 9, wherein hydrotalcite of the coated, primary, nano-scale hydrotalcite particles has a formula $Mg_6Al_2(OH)_{16}CO_3 \cdot 4H_2O$.

11. A process for manufacturing the coated, primary, nano-scale, hydrotalcite particles of claim 1, the process comprising:
contacting i) a magnesium saline solution with ii) an aluminum saline solution, to obtain a first reaction mixture,
adding sodium carbonate and sodium hydroxide to the first reaction mixture, to obtain a second reaction mixture, and
precipitating coated, primary, nano-scale, hydrotalcite particles from the second reaction mixture,
wherein
one of the solutions i) or ii) comprises at least one additive selected from the group consisting of A and B, optionally in combination with an additive C, or
the contacting of i) and ii) further comprises contacting at least one additive selected from the group consisting of A and B, optionally in combination with an additive C, with the first reaction mixture,
wherein the additive A is a growth inhibitor, the additive B is a dispersing agent and the additive C is a diluted fatty acid solution.

12. The process of claim 11, wherein the hydrotalcite comprises $Zn^{2+}$ as a further bivalent metal.

13. The process of claim 11, wherein the hydrotalcite comprises at least one anion selected from the group consisting of sulfate, chloride, and nitrate.

14. The process of claim 11, wherein the hydrotalcite has a formula $Mg_6Al_2(OH)_{16}CO_3 \cdot 4H_2O$.

15. The process of claim 11, wherein the contacting is performed at a temperature of 0 to 90° C.

16. The process of claim 11, wherein the first reaction mixture comprises the additive B.

17. The process of claim 11, wherein the first reaction mixture comprises 0.1 to 30 mass % of the additive A, based on a solids content of hydrotalcite in the first reaction mixture, and optionally 0.1 to 10 mass % of the additive C, based on a solids content of hydrotalcite in the first reaction mixture.

18. The process of claim 11, which produces nano-scale hydrotalcite particles where at least 90% of the individual particles have a diameter ≤100 nm.

19. The process of claim 11, wherein said additive C is present and is a stearate solution.

* * * * *